(12) United States Patent
Bart

(10) Patent No.: US 10,234,163 B1
(45) Date of Patent: Mar. 19, 2019

(54) THERMOSTAT TECHNOLOGY

(71) Applicant: Alarm.com Incorporated, Vienna, VA (US)

(72) Inventor: Gary Franklin Bart, Weston, FL (US)

(73) Assignee: Alarm.com Incorporated, Tysons, VA (US)

( * ) Notice: Subject to any disclaimer, the term of this patent is extended or adjusted under 35 U.S.C. 154(b) by 667 days.

(21) Appl. No.: 14/931,161

(22) Filed: Nov. 3, 2015

Related U.S. Application Data

(60) Provisional application No. 62/074,559, filed on Nov. 3, 2014.

(51) Int. Cl.
| | |
|---|---|
| *F24F 11/70* | (2018.01) |
| *F24F 11/62* | (2018.01) |
| *F24F 11/52* | (2018.01) |
| *F24F 11/30* | (2018.01) |
| *G05B 15/02* | (2006.01) |
| *G05D 23/19* | (2006.01) |
| *F24F 11/56* | (2018.01) |
| *F24F 11/64* | (2018.01) |

(Continued)

(52) U.S. Cl.
CPC .............. *F24F 11/70* (2018.01); *F24F 11/30* (2018.01); *F24F 11/62* (2018.01); *G05B 15/02* (2013.01); *G05D 23/1919* (2013.01); *F24F 11/52* (2018.01); *F24F 11/56* (2018.01); *F24F 11/64* (2018.01); *F24F 2110/10* (2018.01); *F24F 2110/20* (2018.01); *F24F 2120/10* (2018.01)

(58) Field of Classification Search
CPC .. F24F 11/006; F24F 11/0012; F24F 11/0015; F24F 11/0034; F24F 11/0076; F24F 11/0086; F24F 11/053; F24F 11/02; G05B 15/02; G05D 23/1919
See application file for complete search history.

(56) References Cited

U.S. PATENT DOCUMENTS

| | | | | |
|---|---|---|---|---|
| 4,659,236 A | * | 4/1987 | Hobbs ...................... | G01K 1/14 236/94 |
| 5,381,950 A | * | 1/1995 | Aldridge ............ | G05D 23/1902 236/1 R |

(Continued)

FOREIGN PATENT DOCUMENTS

WO        2014172149 A1    10/2014

OTHER PUBLICATIONS

Definition of 'wall' downloaded for URL < https://www.merriam-webster.com/dictionary/wall> on Jun. 6, 2018.*

(Continued)

*Primary Examiner* — Joseph Schoenholtz
(74) *Attorney, Agent, or Firm* — Fish & Richardson P.C.

(57) ABSTRACT

At least one aspect of the present disclose is directed towards a temperature control device that includes a face plate, a housing, and an adjustment mechanism. The housing may protrude away from the rear side of the face plate. The housing may include a mounting mechanism that includes a set of clamps configured to engage at least a portion of an inner surface. The set of clamps may be adjustable based on alterations to the adjustment mechanism. The housing may also include one or more cavities that may be configured to receive at least a portion of the set of clamps when the set of clamps is collapsed into the housing.

20 Claims, 9 Drawing Sheets

(51) Int. Cl.
*F24F 110/20* (2018.01)
*F24F 120/10* (2018.01)
*F24F 110/10* (2018.01)

(56) References Cited

U.S. PATENT DOCUMENTS

| | | | | |
|---|---|---|---|---|
| 6,032,867 | A * | 3/2000 | Dushane | G05D 23/1904 |
| | | | | 236/46 R |
| 6,347,747 | B1 * | 2/2002 | Nesbitt | G01K 13/022 |
| | | | | 236/78 D |
| 7,058,477 | B1 * | 6/2006 | Rosen | G05D 23/1931 |
| | | | | 700/277 |
| RE40,437 | E | 7/2008 | Rosen | |
| 7,578,135 | B2 * | 8/2009 | Mattheis | F24F 11/89 |
| | | | | 62/129 |
| 9,577,389 | B2 * | 2/2017 | Dicks | H01R 13/6683 |
| 9,863,656 | B2 * | 1/2018 | Amerson | G01K 1/08 |
| 2006/0108432 | A1 | 5/2006 | Mattheis | |
| 2010/0101854 | A1 * | 4/2010 | Wallaert | F24F 11/00 |
| | | | | 174/502 |
| 2010/0171889 | A1 * | 7/2010 | Pantel | G02F 1/133308 |
| | | | | 349/1 |
| 2011/0267826 | A1 * | 11/2011 | Santiago | F21V 21/048 |
| | | | | 362/365 |
| 2012/0033434 | A1 | 2/2012 | Wang | |
| 2013/0099009 | A1 * | 4/2013 | Filson | G05D 23/1902 |
| | | | | 236/1 C |
| 2013/0338839 | A1 | 12/2013 | Rogers | |
| 2017/0025886 | A1 * | 1/2017 | Rohmer | H02J 7/0044 |
| 2018/0014391 | A1 * | 1/2018 | Lark, Jr. | H05B 37/0227 |
| 2018/0014392 | A1 * | 1/2018 | Charlton | G08B 5/36 |
| 2018/0014393 | A1 * | 1/2018 | Cheung | H03K 17/96 |
| 2018/0023839 | A1 * | 1/2018 | Adamik | F24F 11/30 |
| | | | | 236/1 C |
| 2018/0070424 | A1 * | 3/2018 | Lark, Jr. | H01H 1/00 |
| 2018/0129404 | A1 * | 5/2018 | Fadell | G05D 23/1902 |

OTHER PUBLICATIONS

PCT Notification of Transmittal of the International Search Report and the Written Opinion of the International Searching Authority for International Application No. PCT/US15/58846, dated Mar. 2, 2016, 11 pages.

* cited by examiner

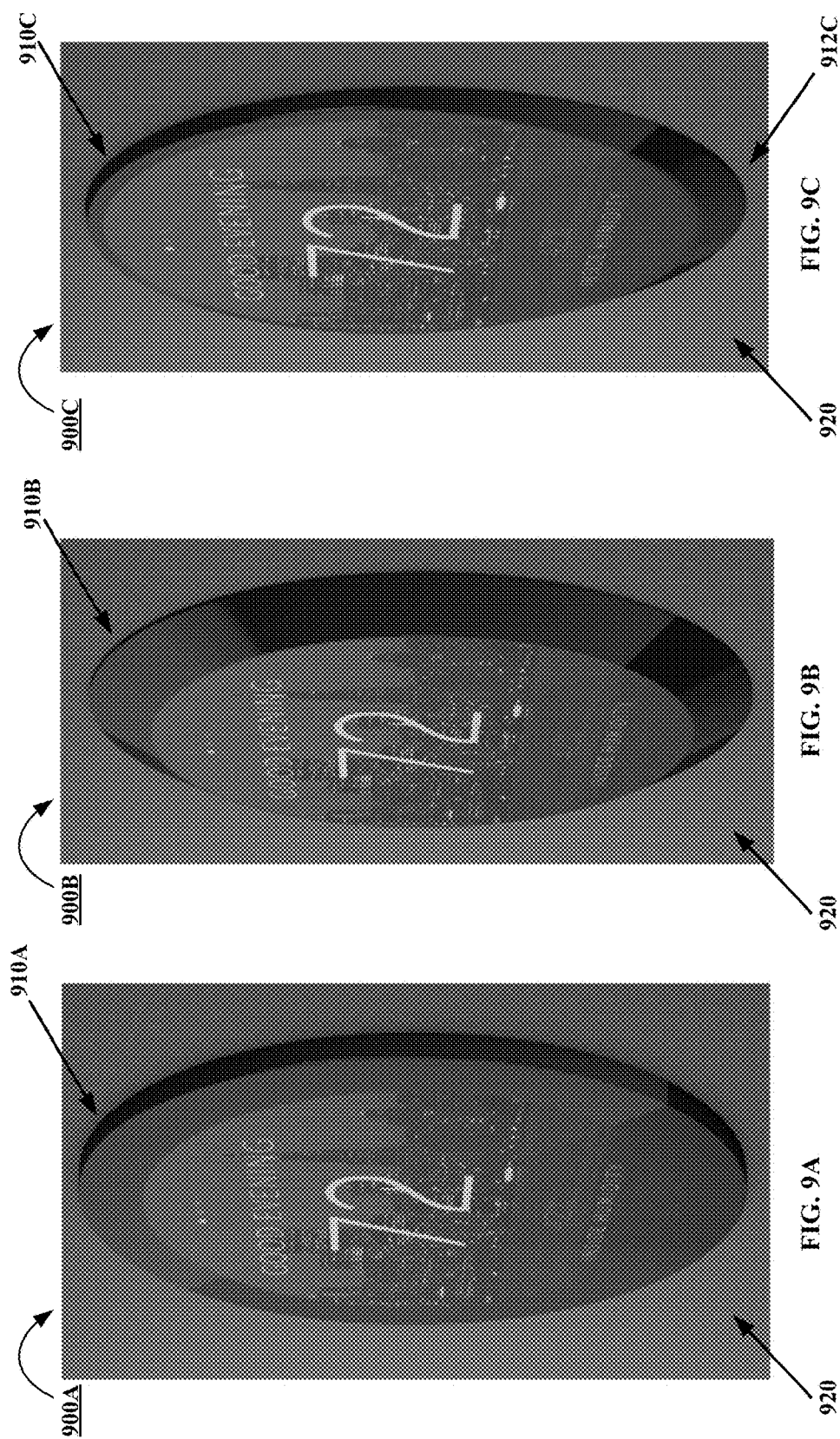

THERMOSTAT TECHNOLOGY

CROSS-REFERENCE TO RELATED APPLICATION

This application claims the benefit of U.S. Provisional Patent Application No. 62/074,559 filed on Nov. 3, 2014 and entitled "THERMOSTAT TECHNOLOGY," which is incorporated herein by reference in its entirety.

BACKGROUND

Thermostats may be simple control devices for heating, ventilating and cooling (HVAC) systems and operate as discrete and independent devices in relation to other devices in a property, such as, for example, a home, a business, a school, and/or the like. Additionally, thermostats may not be remotely controllable nor integrated into mobile communication device applications. Currently, with the advent of wireless technologies, mobile communication devices (e.g., smartphones, tablets, etc.) and mobile device applications, thermostats can be remotely controlled and programmed via mobile device applications. The thermostats, however, have remained relatively the same with respect to how a user interacts with it in the property. For example, thermostats may have displays or indicators of the current temperature and the set target temperature, buttons for the user to press, etc. Most thermostats, however, are visually unappealing and typically protrude from the wall on which they are mounted in an inconvenient manner (e.g., a significant protrusion).

Also, thermostats are connected to a group of wires that run from the location of the thermostat to the HVAC equipment. The HVAC systems provide a low-voltage current via the wires, but many do not include a common or ground wire. As such, thermostats use a variety of methods to obtain necessary power to operate. For instance, thermostats may include batteries or scavenge power from the low-voltage lines.

Thermostats also measure room temperature from sensing elements included within the thermostat itself. Such thermostats may be located in hallways within homes or offices, most often very close to the air handler of a central HVAC system. This is where the volume of air returns to the HVAC system to be cooled (or heated) and reaches its warmest temperature when cooling or coldest temperature while heating. This temperature may not be indicative of the temperature of the room(s) where occupants spend their time, such as, for example, in living rooms, family rooms, kitchens, and bedrooms, conference rooms, personal office rooms, and/or the like. Furthermore, various conditions lead to different rooms having temperature characteristics that are very different from other rooms in the same building. This is typically due to the direction of the sun, number of windows, insulation differences, and the position of room doors (open or closed). Currently, some thermostats adjust temperature settings based on whether or not an occupant is at an establishment (e.g., a home, an office, etc.) by attempting to detect motion in the home. However, occupants may not normally walk by a motion sensor included in the thermostat and the desired result may not be achieved.

SUMMARY

According to one aspect of the subject matter described in this specification, a temperature control apparatus is disclosed that may comprise a face plate and a housing that protrudes from the face plate. The face plate may include a front side and a rear side. The front side of the face plate may facilitate access to an adjustment mechanism. In certain implementations, at least a portion of the rear side of the face plate may be configured to contact an outer surface. The housing of the temperature control apparatus may protrude a first distance from the rear side of the face plate. The housing may include a mounting mechanism that includes a set of clamps configured to engage an inner surface. At least a portion of each clamp in the set of clamps may be configured to collapse into the housing. The length of each clamp in the set of clamps may be shorter than the first distance. The housing may further include one or more cavities that may be configured to receive at least a portion of at least one clamp in the set of clamps when the set of clamps is collapsed into the housing. The housing may also include a configurable distance that exists between the end of at least one clamp and the rear side of the face plate. The configurable distance may be configured to increase responsive to a first alteration of the adjustment mechanism or decrease responsive to a different alteration of the adjustment mechanism.

According to another aspect of the subject matter described by this specification, a device is disclosed that comprises a face plate, a protrusion, and an adjustment mechanism. The face plate may include a front side and a rear side. In certain implementations, at least a portion of the rear side of the face plate may be configured to engage at least a portion of an outer surface. The protrusion of the device may protrude away from the rear side of the face plate. The protrusion may include a mounting mechanism that includes a set of clamps configured to engage at least a portion of an inner surface, wherein the set of clamps is adjustable based on alterations to the adjustment mechanism. The protrusion may also include one or more cavities that are configured to receive at least a portion of the set of clamps in response to a particular alteration of the adjustment mechanism.

According to yet another aspect of the subject matter described by this specification, a device is disclosed that includes a face plate, a housing, and an adjustment mechanism. The face plate of the device may include a front side and a rear side, wherein at least a portion of the rear side of the face plate may be configured to contact at least a portion of the outer surface of a wall. In certain implementations, the face plate may not include a temperature display or temperature measurement circuitry. The housing of the device may be coupled to the face plate and project away from the rear side of the face plate. The housing may be configured to extend through an opening in the outer surface of the wall and reside behind the outer surface of the wall. The housing may further include a set of collapsible clamps configured to engage an inner surface of a wall, wherein the set of clamps is adjustable based on alterations to the adjustment mechanism. The housing may further include a circuit board. The circuit board may include a communications interface configured to receive information that includes one or more types of temperature control data, a memory storage area that includes a temperature database that is configured to store the received temperature control data, and a processor that performs temperature measurement calculations based on the received temperature control data.

Other implementations of the subject matter described by the present specification may be directed to a temperature control device that may include a face plate with a rear side, wherein at least a portion of the rear side of the face plate may be configured to directly, or indirectly, contact the outer surface of a wall. Alternatively, or in addition, certain implementations of the subject matter of the present disclosure may include a set of clamps that may be configured to engage the inner surface of a wall. In certain instances, the temperature control device may include a set of clamps that includes two or more clamps.

Yet other implementations of the subject matter described by the present specification may be directed towards a mounting mechanism that includes a set of clamps that may be configured to collapse into one or more cavities of the housing in response to the exertion of a force upon at least one clamp of the set of clamps. The mounting mechanism may include at least one spring that contracts in response to the exertion of a force upon at least one clamp in the set of clamps and expands in response to the release of the force upon the at least one clamp. Alternatively, or in addition, the set of clamps may be configured to collapse into one or more cavities of the housing in response to a particular alteration of the adjustment mechanism.

Furthermore, other implementations of the subject matter described by the present specification provide for a configurable distance that may be increased by retracting the set of clamps responsive to the adjustment mechanism. Similarly, the configurable distance may be decreased by deploying the set of clamps responsive to the adjustment mechanism.

Other implementations of the subject matter described by the present specification may be directed to a temperature control apparatus that may include a communication interface, a memory storage area, and a processor. The communications interface may be configured to receive one or more types of temperature control data from one or more remote temperature control sensors that may each be associated with one or more rooms of a property, wherein the temperature control data may include one or more of a temperature measurement, a humidity measurement, detection of the movement of an object, or a number of occupants for a particular room. The memory storage area may be configured to include a temperature database that includes an identifier associated with each room of a property, wherein the memory storage area is configured to store the received temperature control data. The processor may perform temperature measurement calculations based on the received temperature control data. The temperature control apparatus may, or may not, include any local temperature and/or humidity sensors.

BRIEF DESCRIPTION OF THE DRAWINGS

FIGS. 9A, 9B, and 9C are images showing perspective views of different examples of face plates that may each include a graphical user interface.

DETAILED DESCRIPTION

Techniques are described to accurately and effectively measure and control temperature in a distributed fashion in multiple rooms at one time that is receptive to individual room temperature, occupancy, and preferences. For instance, a thermostat may include a tube that includes the batteries, circuit boards, wire connectors, and relays, and extends inside the wall through a small round opening.

Figure 1:
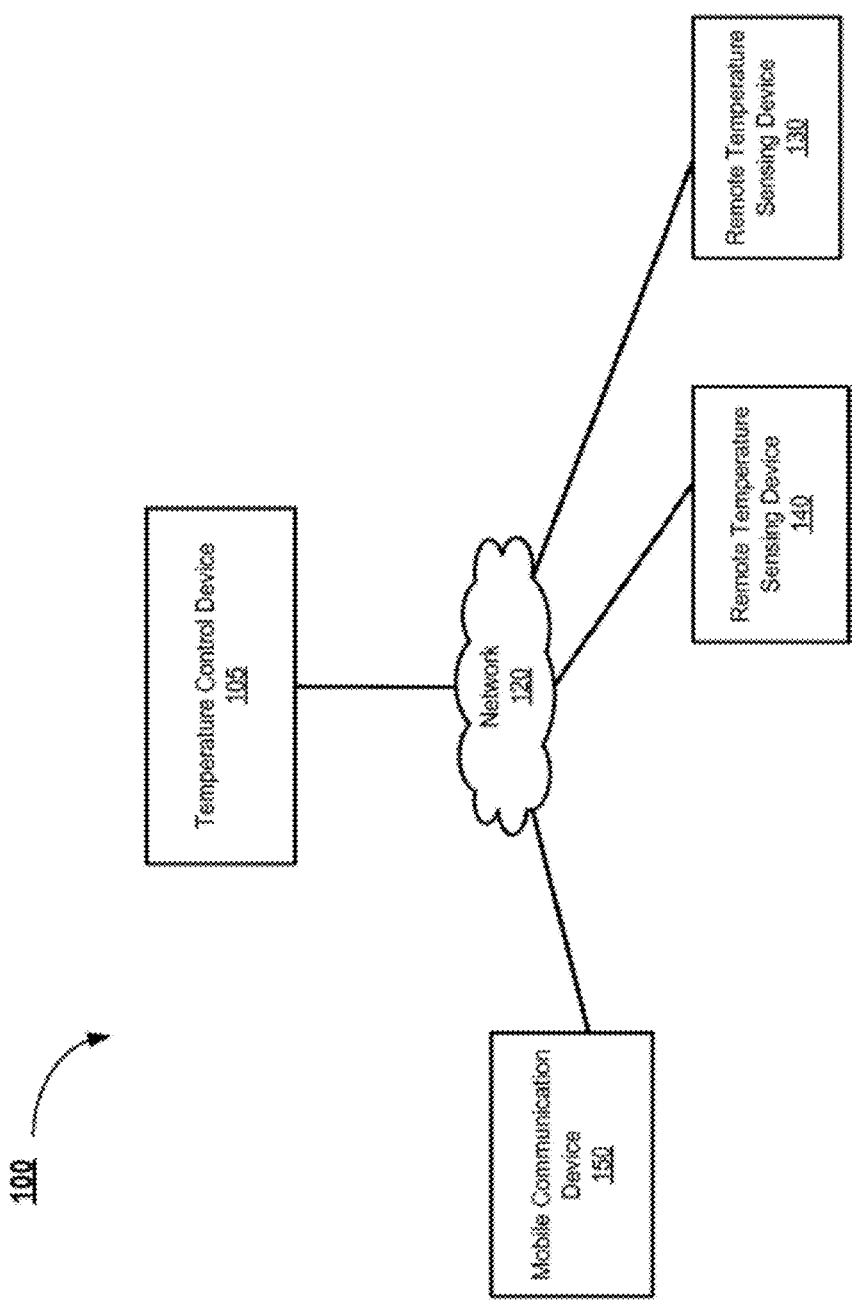
FIG. 1 is a schematic illustration of example components of a distributed temperature sensing and control system.

FIG. 1 illustrates example components of a distributed temperature sensing and control system 100. The distributed temperature sensing and control system 100 includes a temperature control device 105, a network 120, remote temperature sensing devices 130 and 140, and a mobile communication device 150. The distributed temperature sensing and control system 100 measures temperature in a distributed fashion from individual (multiple) rooms in an entity or property (e.g., a house, a school, an office, etc.) at one time in order to create a desired optimal average temperature for all the rooms, and control temperature to match closely to the desired optimal average temperature. The performance of the distributed temperature sensing and control system 100 can also be adjusted based on the particular location of the different rooms, the number of occupants in the room, individual preferences of the occupants, and/or the like. FIG. 1 shows the temperature control device 105 operatively coupled to two remote temperature sensing devices 130 and 140 and one mobile communication device 150 as an example only. In other configurations, the temperature control device 105 can be operatively coupled to more than one mobile communication device 150 and more than two remote temperature sensing devices 130 and 140.

In some implementations, the temperature control device 105 can include wireless port(s) in a communication interface to send and/or receive data units (e.g., data packets) via a variety of wireless communication protocols, such as, for example, a Wi-Fi® protocol, a Worldwide Interoperability for Microwave Access (WiMAX) protocol, a Bluetooth low energy technology (BTLE) protocol, a cellular protocol (e.g., a third generation mobile telecommunications (3G), a fourth generation mobile telecommunications (4G) protocol, or a 4G long term evolution (4G LTE) protocol), and/or the like. The network 120 can be any type of network (e.g., a local area network (LAN), a wide area network (WAN), a virtual network, and/or a telecommunications network) implemented as a wired network and/or a wireless network and can include an intranet, an Internet Service Provider (ISP) and the Internet, a cellular network, and/or the like. The remote temperature sensing devices 130 and 140 can be any analog and/or digital temperature sensors, such as, for example, infra-red (IR) thermopile temperature sensors, thermocouples, silicon bandgap temperature sensors, resistance temperature detectors (RTDs), and/or the like. The remote temperature sensing devices 130 and 140 can be small, battery-operated sensors that can operate on, for example, BTLE technology and can be placed in various areas around the entity (e.g., a home, an office, a school, etc.). The temperature control device 105 can communicate with remote temperature sensing devices 130 and 140 using any of the wireless protocols described above to receive temperature (and/or humidity) measurement data from the individual remote temperature sensing devices 130 and 140.

The temperature control device 105 can be a thermostat that includes a wireless transceiver (e.g., antennae) for communication with the remote temperature sensing devices 130 and 140 and/or the mobile communication device 150. Additionally, the temperature control device 105 can also include a capacitive user interface that can allow direct interaction with a user and can eliminate physical buttons and display units to show the user the current temperature, the desired or set temperature and various operating modes. The temperature control device 105 is discussed in greater detail below in relation to FIG. 2. Together, temperature control device 105 can communicate with remote temperature sensing devices 130 and 140 to form a distributed temperature sensing and control system 100 that can allow for the temperature control device 105 to become aware of the patterns, location, and preferences of the occupants in different rooms of an entity, as stated above.

Figure 2:
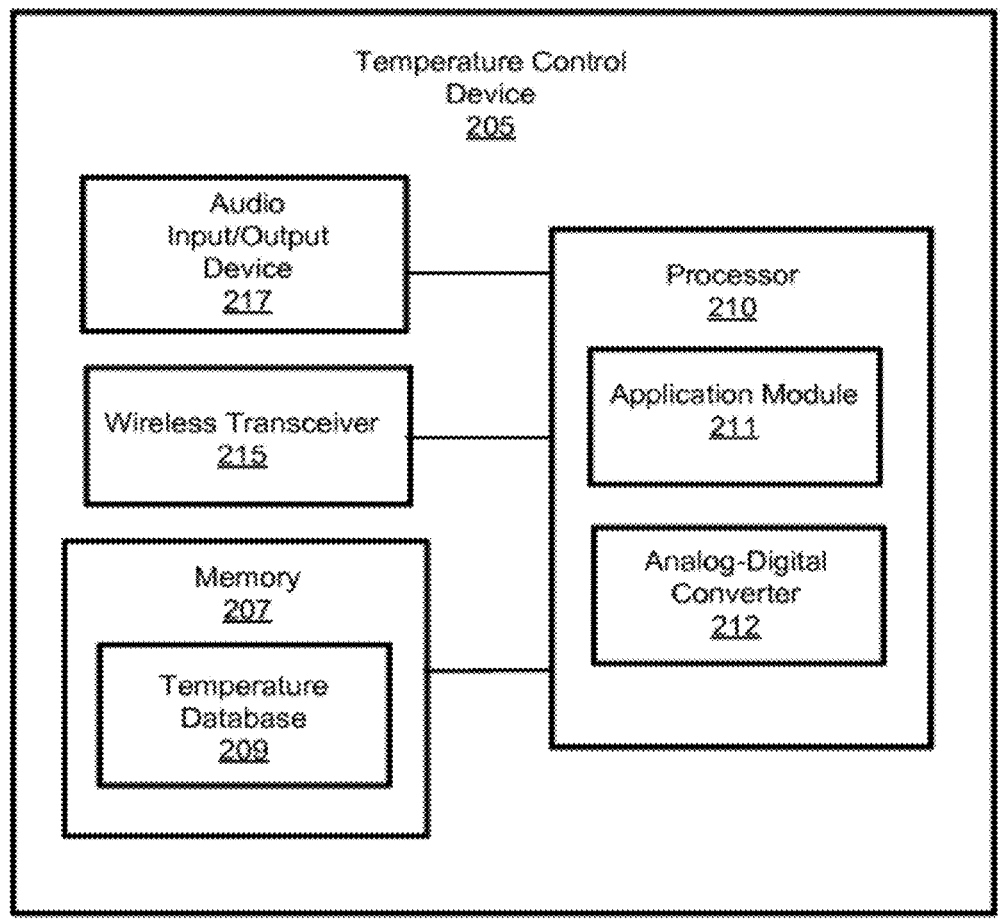
FIG. 2 is a block diagram of an example temperature control device.

FIG. 2 illustrates example electrical components of a temperature control device 205. The temperature control device 205 can include a memory 207, a processor 210, a wireless transceiver 215, and an audio input/output device 217. The memory 207 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 207 can store instructions to cause the processor 210 to execute modules, processes and/or functions associated with the temperature control device 205. The memory 207 can include a temperature database 209 that can store an identifier associated with different rooms of a property, the current temperature and/or humidity values in the different rooms of a property as reported by data transmitted by the different remote temperature sensing devices (e.g., remote temperature sensing devices 130 and 140 shown in FIG. 1), the set or desired temperature that is configured by the user (e.g., through data signals received by mobile communication devices), the local weather conditions in the area of the entity (e.g., local temperature, humidity, cloud cover, UV index, etc.), data associated with occupancy of the different rooms in the entity, the occupancy preferences, the local time (e.g., that determines the position of the sun with respect to the different rooms), and/or the like.

The processor 210 can be, for example, a general purpose processor, a Field Programmable Gate Array (FPGA), an Application Specific Integrated Circuit (ASIC), a Digital Signal Processor (DSP), and/or the like. The processor 210 can run and/or execute application processes and/or other modules, processes and/or functions associated with the temperature control device 205. The processor 210 can include an application module 211 and an analog-digital converter 212. The application module 211 can be a hardware module or a software module (stored in the memory and/or executed in the processor of the temperature control device 205) that can implement a capacitive user interface for interacting with a user (e.g., accepting user inputs). The user interface may eliminate physical buttons and the need for a display device (unit) to show or present to the user the current temperature, set temperature and various operating modes of the temperature control device 205.

In some implementations, the user does not need to touch the temperature control device 205. Instead, the temperature control device may include equipment (e.g., one or more cameras, one or more motion sensors, or the like) to detect a user's gestures. In such implementations, a user may place their hand in close proximity to the temperature control device 205 and then use gestures to change settings in the temperature control device 205. For example, waving of the user's hand in an upward direction can increase the temperature setting, waving of the user's hand in a downward direction can lower the temperature setting, and waving of the user's hand in a horizontal direction can cause the temperature control device 205 to change operating modes.

In other implementations, the audio input/output device 217 can include a speaker and/or a microphone to receive desired temperature set values from the user in an audible form (e.g., spoken language) and/or to inform the user of the current local temperature patterns across the different rooms in the property. The audio inputs received by the audio input/output device 217 are sent to the processor 210 for digitization and processing. The audio input/output device 217 can operate through a set of perforations on the front panel of the control device (as seen in FIGS. 3 and 4). In some implementations, the temperature control device 205 can also include a power or voltage generation source that supplies voltage to the different electronic components of the circuit board in the temperature control device 205 and can be for example, an AAA battery, a lithium polymer battery, a solar panel voltage source, and/or the like.

The application module 211 can periodically or substantially periodically obtain the current temperature (and/or humidity level) or most recently recorded temperature (and/or humidity level) of the different rooms in the property from the temperature database 209 and generate an average temperature value for the property. The application module 211 can compare this current average temperature value of the property with the desired temperature value set by the user and send signals to the HVAC devices for cooling or heating the rooms accordingly in order to match the average temperature with the desired temperature. The analog-to-digital converter(s) 212 can digitally sample the received signal from the user and/or the different remote temperature sensing devices. After digitization, the digitized signal can be sent to the application module 211 for further processing for efficient control of the temperature of the different rooms in the property.

The wireless transceiver 215 can send data units (e.g., data packets, data cells) to and/or receive data units from one or multiple mobile communication devices associated with users and/or the different remote temperature sensing devices located in the different rooms in the property and/or HVAC devices using a variety of different wireless communication standards, such as, for example, Wi-Fi®, Bluetooth®, Bluetooth® Low Energy (e.g., Bluetooth® 4.0, Bluetooth® Smart), Near-Field Communication (NFC) protocol, third generation mobile telecommunications (3G), fourth generation mobile telecommunications (4G), and/or the like.

In some implementations, the temperature control device 205 can incorporate the audio input/output device 217 (e.g., microphone, speaker, etc.) out of the same opening for any additional temperature and/or humidity sensors. In such implementations, the user can issue voice commands to and hear a response from the temperature control device 205. Such a feature, when combined with wireless (e.g., BLTE) connectivity, can allow the temperature control device 205 to connect directly with mobile communication devices associated with a user (e.g., smartphone, tablet, laptop computer, etc.). This can allow the temperature control device 205 to operate the mobile communication device's voice recognition and response technology for control over temperature control device 205 functions, as well as any other function normally used with the user communication device (e.g., phone calls). In such implementations, the temperature control device 205 can essentially function like, for example, a Bluetooth headset. Hence, the temperature control device 205 with no special user interface or buttons, can act as a monitor for capturing voice commands and transmitting the commands to a mobile communication device wirelessly. Such a concept can be applied to any number of household smart devices, any of which, once equipped with, for example, a microphone, speaker and Bluetooth technology, could communicate with a smartphone, tablet or home computer in this fashion. In some implementations, the temperature control device 205 can include a local temperature and/or humidity sensor within. In such implementations, the temperature control device 205 can serve as one node for measuring temperature (and/or humidity) in a distributed temperature measurement and control system. In other implementations, the temperature control device 205 does not include any local temperature and/or humidity sensors.

Figure 3A:
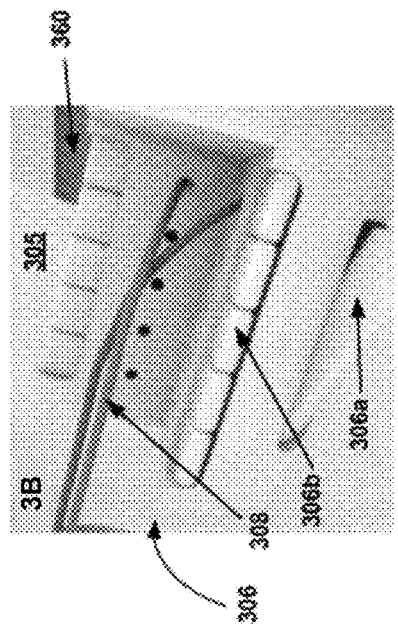
FIGS. 3A, 3B, 3C and 3D are images showing an example mechanism for mounting a temperature control device into a wall.
Figure 3B:
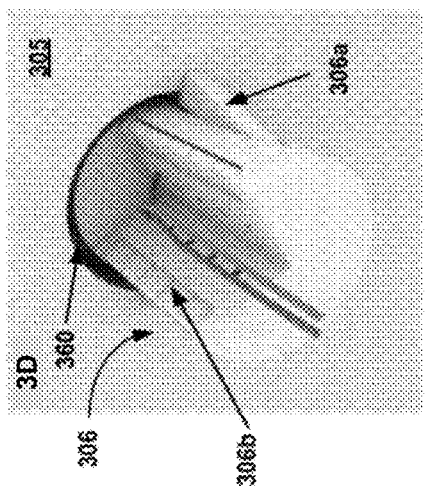
Figure 3C:
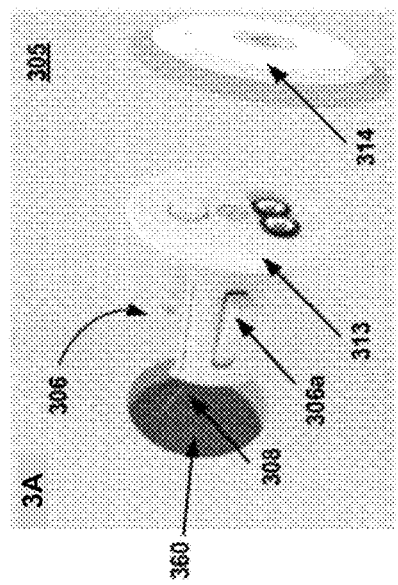
Figure 3D:
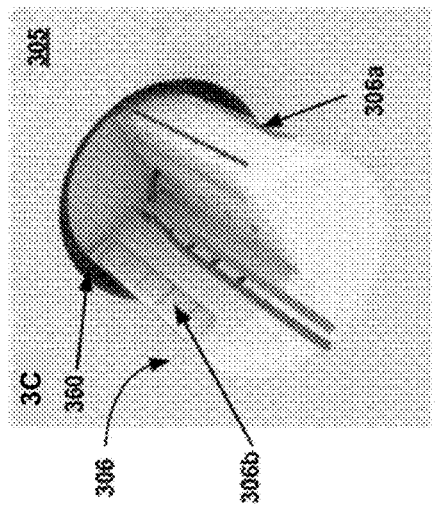

FIGS. 3A-3D are images showing an example mechanism for mounting a temperature control device into a wall. In some implementations, as represented in FIGS. 3 and 4, the temperature control device 305 incorporates features for enabling the retrofit of the temperature control device 305 into the wall without the use of tools or mounting screws. The temperature control device 305 includes a spring-loaded clamping mechanism 306 that collapses a set of clamps 306a when the temperature control device 305 is inserted into a wall (e.g., drywall) through an opening in the wall 360, and opens the set of clamps 306a once the temperature control device 305 is moved to a position in which the set of clamps 306a slide behind the wall. This securely fastens the temperature control device 305 to the wall. The temperature control device 305 also includes a set of wires 308 that are wires from the HVAC system within the wall cavity, levers 306b to release the HVAC wires, a faceplate 313 and a cover plate 314. FIG. 3C, in particular, shows the temperature control device 305 partially inserted in the wall cavity from a perspective inside the wall with the retractable clamps 306a retracted. FIG. 3D, in particular, shows the temperature control device 305 in place inside the wall with the clamps 306a deployed, thus securely fastening the temperature control device 305 within the wall cavity. The clamping mechanism 306 is adjustable in depth and the temperature control device 305 can include a device for retracting the set of clamps 306a for removal. For instance, adjusting the depth of the clamps 306a may modify a configurable distance that exists between the clamps 306a and the inner surface of the wall cavity by moving the clamps 306a towards the surface of the wall cavity to secure the temperature control device 305 during mounting. Alternatively, adjusting the depth of the clamps 306a may similarly modify the configurable distance that exists between the clamps 306a and the inner surface of the wall cavity by moving the clamps 306a away from the surface of the wall cavity to loosen the temperature control device 305 for removal. The wall mounting mechanism for the temperature control device 305 can also be useful in other devices not related to temperature control devices 305.

Figure 4A:
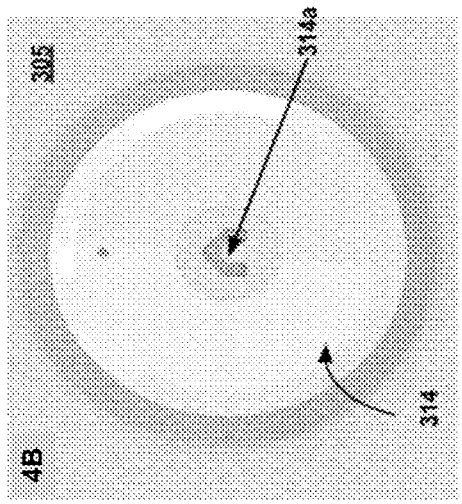
FIGS. 4A, 4B, 4C and 4D are images showing different perspectives of an example temperature control device after mounting into a wall.
Figure 4B:
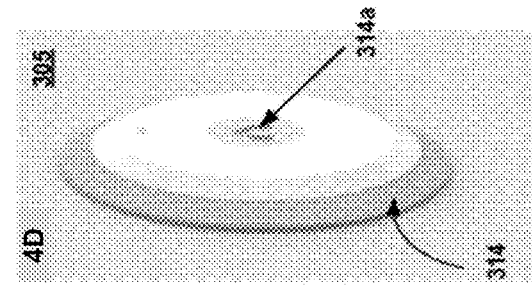
Figure 4C:
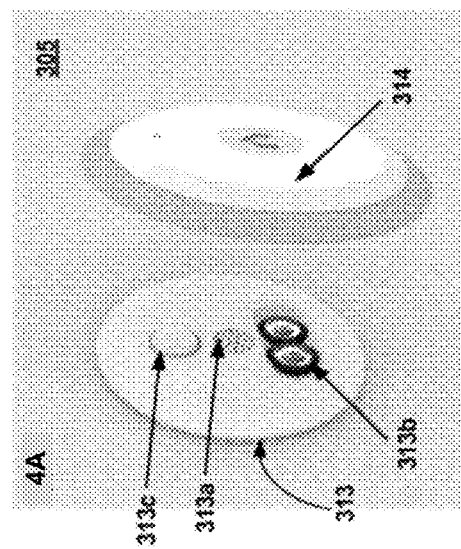
Figure 4D:
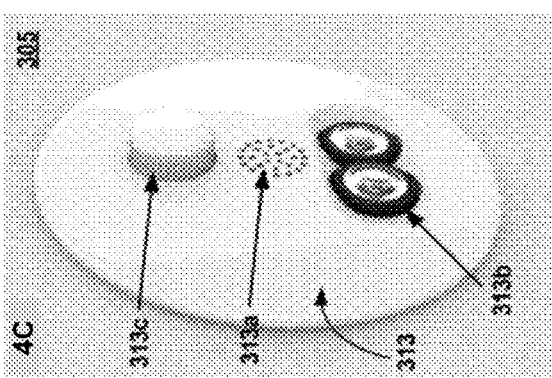

FIGS. 4A-4D are images showing different perspectives of an example temperature control device after mounting into a wall. FIG. 4A shows a partial blowup image of the temperature control device 305 from outside a wall after being mounted on the wall, where the temperature control device 305 is fully inserted into the wall and the cover plate 314 is removed. FIG. 4B shows the frontal image of the temperature control device 305 with the temperature control device 305 fully installed inside the wall and with the cover plate 314 in place. FIG. 4B shows the ventilation hole 314a in the cover plate 314 (e.g., the house symbol) that includes a semi-permeable material for covering the opening of the ventilation hole 314a. The semi-permeable membrane acts as a protective barrier and can serve to allow air and humidity to pass back and forth into and out of the temperature control device 305, while restricting dust particles and other particulate contaminants from entering inside the temperature control device 305. FIG. 4C shows a side view of the temperature control device 305 from outside a wall after being mounted on the wall without the cover plate 314. FIG. 4C shows the face plate 313 with a set of ventilation perforations 313a, a set of batteries 313b installed and a clamp adjustment knob 313c. The set ventilation perforations 313a allows ambient air and humidity to pass back and forth into and out of the temperature control device 305. The clamp adjustment knob 313c can be adjusted by turning by a user to deploy or retract the set of clamps 306a for mounting the temperature control device 305 into the wall. FIG. 4D shows a side of the temperature control device 305 from outside a wall after being mounted on the wall with the cover plate 314. FIG. 4D highlights that the temperature control device 305 can be mounted on the wall with minimal outward projection after mounting.

The temperature control device described in FIGS. 1-4 may be small in size and may have minimal protrusion from the wall after mounting. This can be accomplished by making use of the volume of space inside of the wall upon which the temperature control device is mounted. This is done by creating a tube that includes the batteries, circuit boards, wire connectors, and relays, and extends inside the wall through a small round opening (e.g., opening 360 in FIG. 3). The temperature control device includes a thin, small, flat cover plate (e.g., cover plate 314 in FIG. 4) that reveals access to the batteries (e.g., batteries 313b in FIG. 4) when removed. Additionally, the temperature control device incorporates an opening (e.g., ventilation hole 314a in FIG. 4), internally covered by a semi-permeable membrane that permits air and water vapor to reach internal sensors while preventing the intrusion of dust.

Furthermore, all interaction in the distributed temperature sensing and control system described here can be performed wirelessly. As part of a larger system of devices and technologies, the temperature control device can become aware of the patterns, location, and preferences of the occupants in different rooms of a property by, for example, receiving signals from one or multiple remotely distributed sensors. The temperature control device will thus be able to anticipate heating and cooling needs based on occupancy in different rooms of a property and forecasted weather patterns. Eliminating the different user interfaces from the temperature control device can enable the temperature control device to be sold at lower prices.

Thermostat manufacturers have tried various methods of overcoming the power demands on batteries for providing wireless access. In some implementations, the temperature control device discussed in FIGS. 1-4 takes a unique approach to this problem by incorporating BLTE technology in its wireless transceivers, which has significantly low impact on battery performance. This, coupled with the lack of a display unit or a user interface, can permit the temperature control device to run for years on potentially fewer, smaller batteries than traditionally possible. A shortcoming of BTLE technology, however, is that it is unable to independently connect to home wireless routers and therefore cannot access the Internet. The distributed temperature sensing and control system described here can ameliorate this limitation in one of two ways. In some implementations, the temperature control device can become a node in an array of one or more other devices that can accept BTLE signals from a multitude of devices, and then connect to a network router via Wi-Fi (the temperature control devices described herein may be wall-powered). This concept is part of an overall distributed device-networking concept. In other implementations, a small dongle that can plug into any electrical outlet and can incorporate BTLE and Wi-Fi capabilities can operate as a low-cost Internet gateway for the temperature control device. Such a dongle can also incorporate a temperature sensor to provide one point of remote distributed temperature sensing to the distributed temperature sensing and control system.

Figure 5:
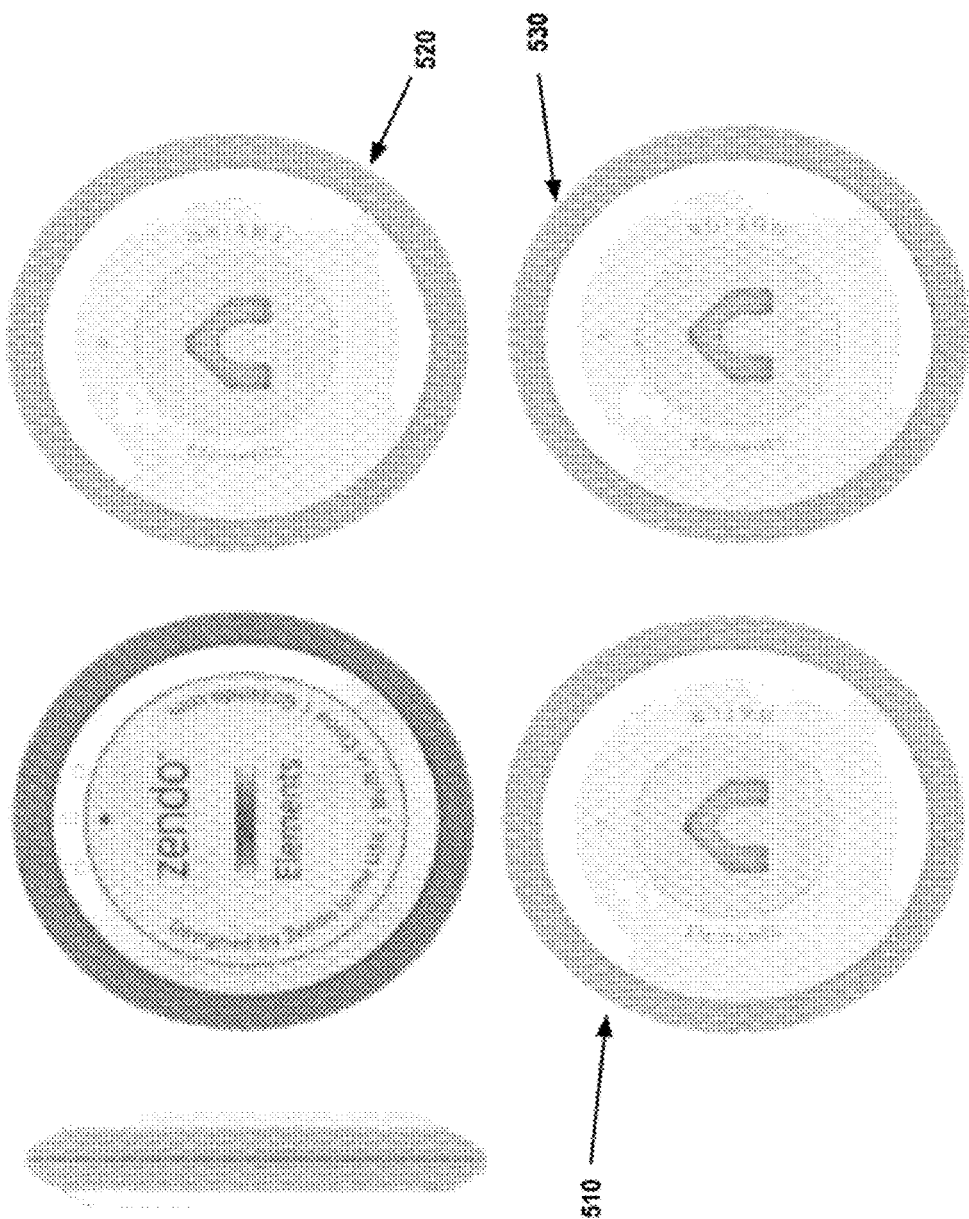
FIG. 5 is an image showing an example group of sensors.

FIG. 5 illustrates an example Bluetooth Low Energy group of sensors. The group of sensors may be used with the temperature control devices described herein. As shown, each sensor is a small (30 mm×8 mm), round, battery-operated (using a CR2032 battery), Bluetooth Low Energy sensor. The sensors are designed to affix to any surface or attach to other items using a lanyard. Various types of sensor products may be used in this configuration, where each may have one or more sensor components itself. A processor is included in the sensor, as well. Examples include a water-leak sensor 510 that can detect the presence of water on its outer surface, a sensor that can detect temperature, humidity levels, and barometric pressure 520, and a sensor that has an accelerometer and possibly a magnetometer 530, which can detect movement and orientation such that it can be used to detect the opening and closing, as well as the position of windows, doors, drawers, cabinets, refrigerators, etc. It can also hang from a doorknob, or be attached to a backpack, keys, purse, or briefcase. In all instances, when one of these sensors detects an event it can notify a temperature control device or a user via an application on a mobile device that something has occurred. The user can utilize these sensors to protect their belongings, home, etc. Additionally, using the BTLE radio, the sensors can be tracked and located and their proximity can be determined using a companion application on a mobile device.

Figure 6:
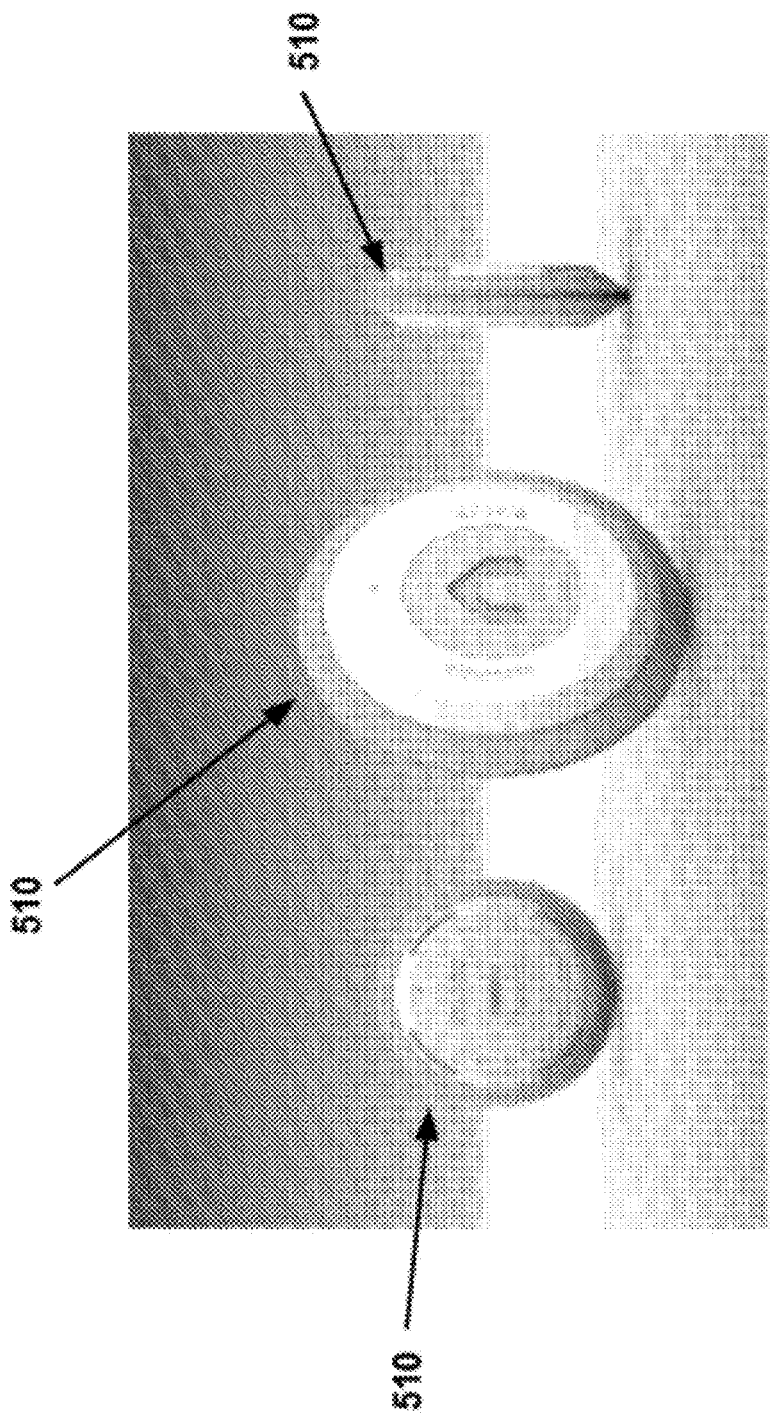
FIG. 6 is an image showing an example water sensor.

FIG. 6 illustrates an example of the water sensor 520. The water sensor 520 includes metallic contacts that detect the presence of water built in to the bottom of the sensor case.

Figure 7:
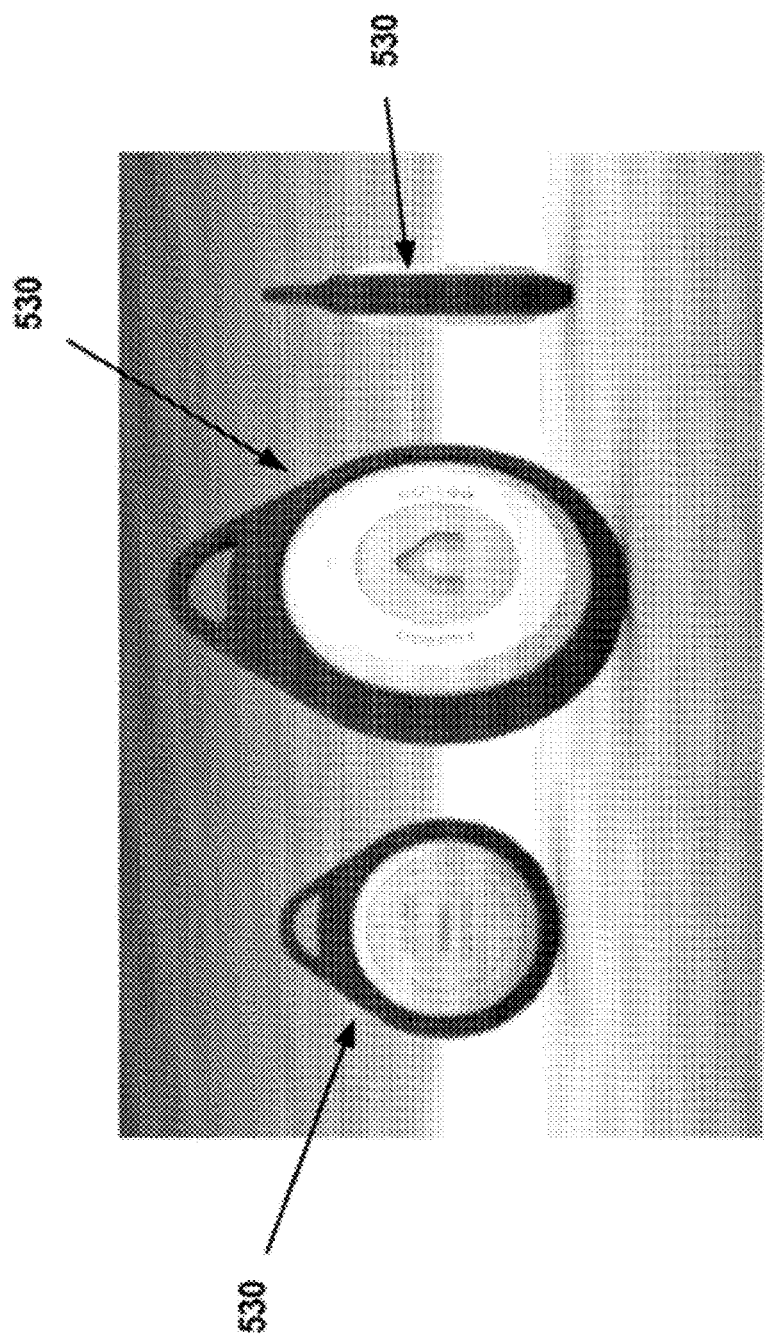
FIG. 7 is an image showing an example motion sensor placed in a rubber case.

FIG. 7 illustrates an example the motion sensor 530. As shown, the motion sensor 530 is included inside a rubber case with a place to attach a lanyard.

Figure 8:
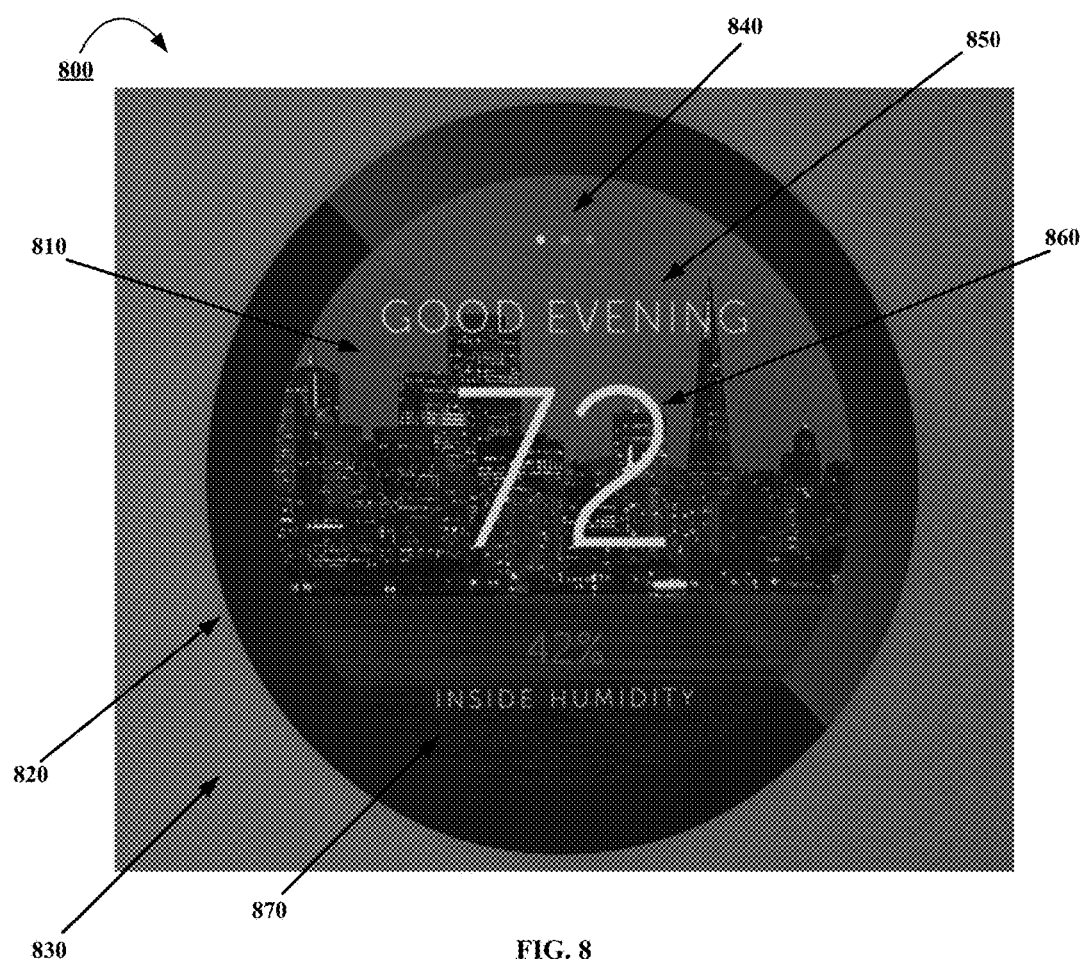
FIG. 8 is an image showing an example of a face plate that includes a graphical user interface.

FIG. 8 is an image showing an example of a face plate 800 that may be mounted in substantially the same way as face plate 313. Face plate 800 may include a graphical user interface 810 and a bezel 820. Bezel 820 may substantially frame the graphical user interface 810. At least a portion of the rear side of the bezel 820 may be configured to engage an outer surface 830 such that at least a portion of the face plate 800 may directly contact the surface 830 without utilizing any tools or mounting screws to mount face plate 800 to the surface 830. Face plate 800 may be configured to be substantially flat, thin, and minimally protrude from the surface 830. Face plate 800 may also be configured to include any of the one or more features described above with respect to face plate 313 such as, for example, a clamp adjustment knob. The clamp adjustment knob may be implemented with either a mechanical adjustment knob or a digital adjustment knob implemented via processor 210 and application module 211.

The faceplate 800 may be configured to receive user input via the graphical user interface 810. Graphical user interface 810 may be configured to receive user inputs detected via the user interaction with integrated capacitive touch sensors. Alternatively, or in addition, face plate 800 may be configured to receive user inputs via other input mechanisms such as, for example, voice input, gestures, instructions received from a mobile device application, and/or instructions received from another computer. However, it is also considered that equipment to facilitate any of the one or more aforementioned alternative input mechanisms may also substantially reside within the portion of the temperature control device 305 that resides behind the particular surface 830 that the temperature control device is mounted on (see FIG. 3).

Graphical user interface 810 may include a plurality of screens that may provide temperature control data for display to a user. When a user interacts with graphical user interface 810, screen indicator 840 may be toggled to indicate which screen of the plurality of screens the user is viewing. Temperature control data that may be provided to the user may include, for example, a greeting 850, a room temperature 860, and an inside humidity reading 870. Alternatively, or in addition, graphical user interface 810 may provide one or more screens that display temperatures from each of one or more remote temperature sensing devices 130, 140 shown in FIG. 1, an average temperature value for a property, the desired room temperature that is configured by a user, a desired average temperature value for the property that is configured by the user, local weather conditions (e.g., local temperature, humidity, cloud cover, UV index, etc.), data associated with the occupancy of different rooms, data associated with object movement within different rooms, occupancy preferences, local time (e.g., by determining the position of the sun with respect to the different rooms), and/or the like. Alternatively, or in addition, graphical user interface 810 may be customized to display a background graphic representative of the user's location (e.g., a skyline of the city nearest the user's location) and/or a particular image or video transmitted by a user to the temperature control device 305 from a mobile device application or other computer.

FIGS. 9A-9C are images showing perspective views of different examples of face plates 900A, 900B, and 900C. Face plates 900A, 900B, and 900C may each include one or more of the features described with respect to faceplates 800 and 313. As shown in FIGS. 9A-9C, each of face plates 900A, 900B, and 900C may be configured to have different types of bezels 910A, 910B, 910C, and 912C. Certain implementations may utilize symmetrical bezels such as, for example, bezels 910A, 910B. Alternatively, certain implementations may utilize asymmetrical bezels that vary in the level of width and protrusion as depicted in 910C, 912C. However, regardless of the type of bezel, face plates 900A, 900B, and 900C may be configured to be mounted to surface 920 in substantially the same manner as face plate 313 of temperature control device 305 so as to not utilize tools or mounting screws.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A temperature control apparatus, comprising:
   a face plate that includes a front side and a rear side, wherein the front side of the face plate facilitates access to an adjustment mechanism, wherein at least a portion of the rear side of the face plate is configured to contact an outer surface; and
   a housing that protrudes a first distance from the rear side of the face plate, the housing further comprising:
      a mounting mechanism that includes a set of clamps configured to engage an inner surface, wherein at least a portion of each clamp in the set of clamps is further configured to collapse into the housing, the length of each clamp in the set of clamps being shorter than the first distance;
      one or more cavities that are configured to receive at least a portion of at least one clamp in the set of clamps when the set of clamps is collapsed into the housing; and
      a configurable distance that exists between the end of at least one clamp and the rear side of the face plate, wherein the configurable distance is configured to increase responsive to a first alteration of the adjustment mechanism or decrease responsive to a different alteration of the adjustment mechanism.

2. The temperature control apparatus of claim 1, wherein the surface is a wall.

3. The temperature control apparatus of claim 1, wherein the set of clamps includes two or more clamps.

4. The temperature control apparatus of claim 1, wherein at least a portion of at least one clamp of the set of clamps is configured to collapse into one or more cavities of the housing in response to the exertion of a force upon at least one clamp of the set of clamps.

5. The temperature control apparatus of claim 1, wherein at least a portion of at least one clamp of the set of clamps is configured to collapse into one or more cavities of the housing in response to a particular alteration of the adjustment mechanism.

6. The temperature control apparatus of claim 1, wherein the configurable distance is increased by retracting the set of clamps responsive to the adjustment mechanism.

7. The temperature control apparatus of claim 1, wherein the configurable distance is decreased by deploying the set of clamps responsive to the adjustment mechanism.

8. The temperature control apparatus of claim 1, wherein the mounting mechanism further comprises:
   at least one spring that contracts in response to the exertion of a force upon at least one clamp in the set of clamps and expands in response to the release of the force upon the at least one clamp.

9. The temperature control apparatus of claim 1, wherein the housing further comprises:
   a communications interface configured to receive one or more types of temperature control data from one or more remote temperature control sensors that are each associated with one or more rooms of a property, wherein the temperature control data includes one or more of a temperature measurement, a humidity measurement, detection of the movement of an object, or a number of occupants for a particular room;
   a memory storage area that includes a temperature database that includes an identifier associated with each room of a property, wherein the memory storage area is configured to store the received temperature control data; and
   a processor that performs temperature measurement calculations based on the received temperature control data.

10. The temperature control apparatus of claim 9, wherein the temperature control apparatus does not include any local temperature and/or humidity sensors.

11. The temperature control apparatus of claim 1, wherein the portion of the rear side of the face plate is configured to directly contact the outer surface.

12. A device, comprising:
    an adjustment mechanism;
    a face plate that includes a front side and a rear side, wherein the front side of the face plate facilitates access to the adjustment mechanism, wherein at least a portion of the rear side of the face plate is configured to engage at least a portion of an outer surface; and
    a protrusion that protrudes away from the rear side of the face plate, the protrusion further comprising:
       a mounting mechanism that includes a set of clamps configured to engage at least a portion of an inner surface that is opposite the outer surface, wherein the set of clamps is adjustable based on alterations to the adjustment mechanism on the front side of the face plate; and
       one or more cavities in the protrusion that are configured to receive at least a portion of the set of clamps in response to a particular alteration of the adjustment mechanism.

13. The device of claim 12, wherein the surface is a wall.

14. The device of claim 12, wherein the mounting mechanism further comprises:
    at least one spring that contracts in response to the exertion of a force upon at least one clamp in the set of clamps and expands in response to the release of the force upon the at least one clamp.

15. The device of claim 12, wherein the protrusion further comprises:
  a communications interface configured to receive one or more types of temperature control data from one or more remote temperature control sensors that are each associated with one or more rooms of a property, wherein the temperature control data includes one or more of a temperature measurement, a humidity measurement, detection of the movement of an object, or a number of occupants for a particular room;
  a memory storage area that includes a temperature database that includes an identifier associated with each room of a property, wherein the memory storage area is configured to store the received temperature control data; and
  a processor that performs temperature measurement calculations based on the received temperature control data.

16. The device of claim 15, wherein the device does not include any local temperature and/or humidity sensors.

17. A device, comprising:
  an adjustment mechanism;
  a face plate that includes a front side and a rear side, wherein at least a portion of the rear side of the face plate is configured to contact at least a portion of the outer surface of a wall, wherein the front side of the face plate facilitates access to the adjustment mechanism, wherein the face plate does not include a temperature display or temperature measurement circuitry; and
  a housing that is coupled to the face plate and projects away from the rear side of the face plate, wherein the housing is configured to extend through an opening in the outer surface of the wall and reside behind the outer surface of the wall, wherein the housing further includes:
    a set of collapsible clamps configured to engage an inner surface of a wall that is opposite the outer surface, wherein the set of clamps is adjustable based on alterations to the adjustment mechanism on the front side of the face plate; and
    a circuit board that includes:
      a communications interface configured to receive information that includes one or more types of temperature control data;
      a memory storage area that includes a temperature database that is configured to store the received temperature control data; and
      a processor that performs temperature measurement calculations based on the received temperature control data.

18. The device of claim 17, wherein the temperature control data is received from one or more remote temperature control sensors that are each associated with one or more rooms of a property, wherein the temperature control data includes one or more of a temperature measurement, a humidity measurement, detection of the movement of an object, or a number of occupants for a particular room.

19. The device of claim 17, wherein the memory storage area further comprises a temperature database that includes an identifier associated with each room of a property.

20. The device of claim 17, wherein the temperature measurement calculations includes generating an average temperature value for the property.

* * * * *